United States Patent
Tanaka

(10) Patent No.: US 9,736,339 B2
(45) Date of Patent: Aug. 15, 2017

(54) IMAGE PROCESSING APPARATUS

(71) Applicant: KYOCERA Document Solutions Inc., Osaka (JP)

(72) Inventor: Kazunori Tanaka, Osaka (JP)

(73) Assignee: Kyocera Document Solutions, Inc. (JP)

( * ) Notice: Subject to any disclaimer, the term of this patent is extended or adjusted under 35 U.S.C. 154(b) by 0 days.

(21) Appl. No.: 15/073,447

(22) Filed: Mar. 17, 2016

(65) Prior Publication Data

US 2016/0286095 A1    Sep. 29, 2016

(30) Foreign Application Priority Data

Mar. 27, 2015   (JP) .................. 2015-065459

(51) Int. Cl.
  *H04N 1/60*    (2006.01)
  *H04N 1/23*    (2006.01)
  *G06K 9/20*    (2006.01)
  *H04N 1/04*    (2006.01)

(52) U.S. Cl.
  CPC ......... *H04N 1/6094* (2013.01); *G06K 9/2018* (2013.01); *G06K 9/2063* (2013.01); *H04N 1/04* (2013.01); *H04N 1/2323* (2013.01); *H04N 1/608* (2013.01); *H04N 2201/0094* (2013.01)

(58) Field of Classification Search
  CPC ...... H04N 1/6094; H04N 1/04; H04N 1/2323; H04N 1/608; H04N 2201/0094; G06K 9/2063

USPC .................. 358/3.2, 453, 538; 382/165, 291
See application file for complete search history.

(56) References Cited

U.S. PATENT DOCUMENTS 5,465,307 A * 11/1995 Azumaya ............. G06K 9/4604
                                                                 358/453
8,545,399 B2 * 10/2013 Takei ................. A61B 1/00009
                                                                 600/109

FOREIGN PATENT DOCUMENTS

JP    2011-223074    11/2011

* cited by examiner

*Primary Examiner* — Quang N Vo

(57) ABSTRACT

An image processing apparatus includes a fluorescence pixel detecting unit, a peripheral pixel analyzing unit, and an image processing unit. The fluorescence pixel detecting unit is configured to detect a fluorescence pixel that has a fluorescent color in a document image. The peripheral pixel analyzing unit is configured to detect consecutive non-fluorescence pixels with no fluorescent colors among peripheral pixels within a predetermined range from the detected fluorescence pixel. The consecutive non-fluorescence pixels is at least a predetermined number of consecutive pixels and has a color difference equal to or less than a predetermined value between one and another of the consecutive non-fluorescence pixels. The image processing unit is configured to perform an emphasizing process of improving visibility for the detected consecutive non-fluorescence pixels.

4 Claims, 2 Drawing Sheets

IMAGE PROCESSING APPARATUS

CROSS-REFERENCE TO RELATED APPLICATIONS

This application relates to and claims priority rights from Japanese Patent Application No. 2015-065459, filed on Mar. 27, 2015, the entire disclosures of which are hereby incorporated by reference herein.

BACKGROUND

1. Field of the Present Disclosure

The present disclosure relates to an image processing apparatus.

2. Description of the Related Art

When making a color copy of a document using a digital color multi function peripheral, the document may include a fluorescent color. Such fluorescent color is a color put with a fluorescent ink pen on the document.

An image processing apparatus detects a color marker area marked with a color marker, and detects as a character a grayscale image in the color marker area.

A usual color in a document is detected from only reflection light of light irradiated to the document, but a color in a part where a fluorescent color marked in a document is detected from light obtained by adding fluorescence to reflection light. Therefore, when a scanner or the like optically scans an image of a document that includes a character marked with a fluorescent ink pen (i.e. a document in which a monochrome character is overlaid with a fluorescent color of such fluorescent ink pen), such character marked with a fluorescent ink pen gets low visibility in a document image obtained by the image scanning.

In particular, if the document is a printed matter printed using a toner save mode and includes a character of low density marked with a fluorescent ink pen, then low visibility of such character is remarkable in the optically scanned document image.

SUMMARY

An image processing apparatus according to an aspect of the present disclosure includes a fluorescence pixel detecting unit, a peripheral pixel analyzing unit, and an image processing unit. The fluorescence pixel detecting unit is configured to detect a fluorescence pixel that has a fluorescent color in a document image. The peripheral pixel analyzing unit is configured to detect consecutive non-fluorescence pixels with no fluorescent colors among peripheral pixels within a predetermined range from the detected fluorescence pixel. The consecutive non-fluorescence pixels is at least a predetermined number of consecutive pixels and has a color difference equal to or less than a predetermined value between one and another of the consecutive non-fluorescence pixels. The image processing unit is configured to perform an emphasizing process of improving visibility for the detected consecutive non-fluorescence pixels.

These and other objects, features and advantages of the present disclosure will become more apparent upon reading of the following detailed description along with the accompanied drawings.

DETAILED DESCRIPTION

Hereinafter, an embodiment according to an aspect of the present disclose will be explained with reference to drawings.

Figure 1:
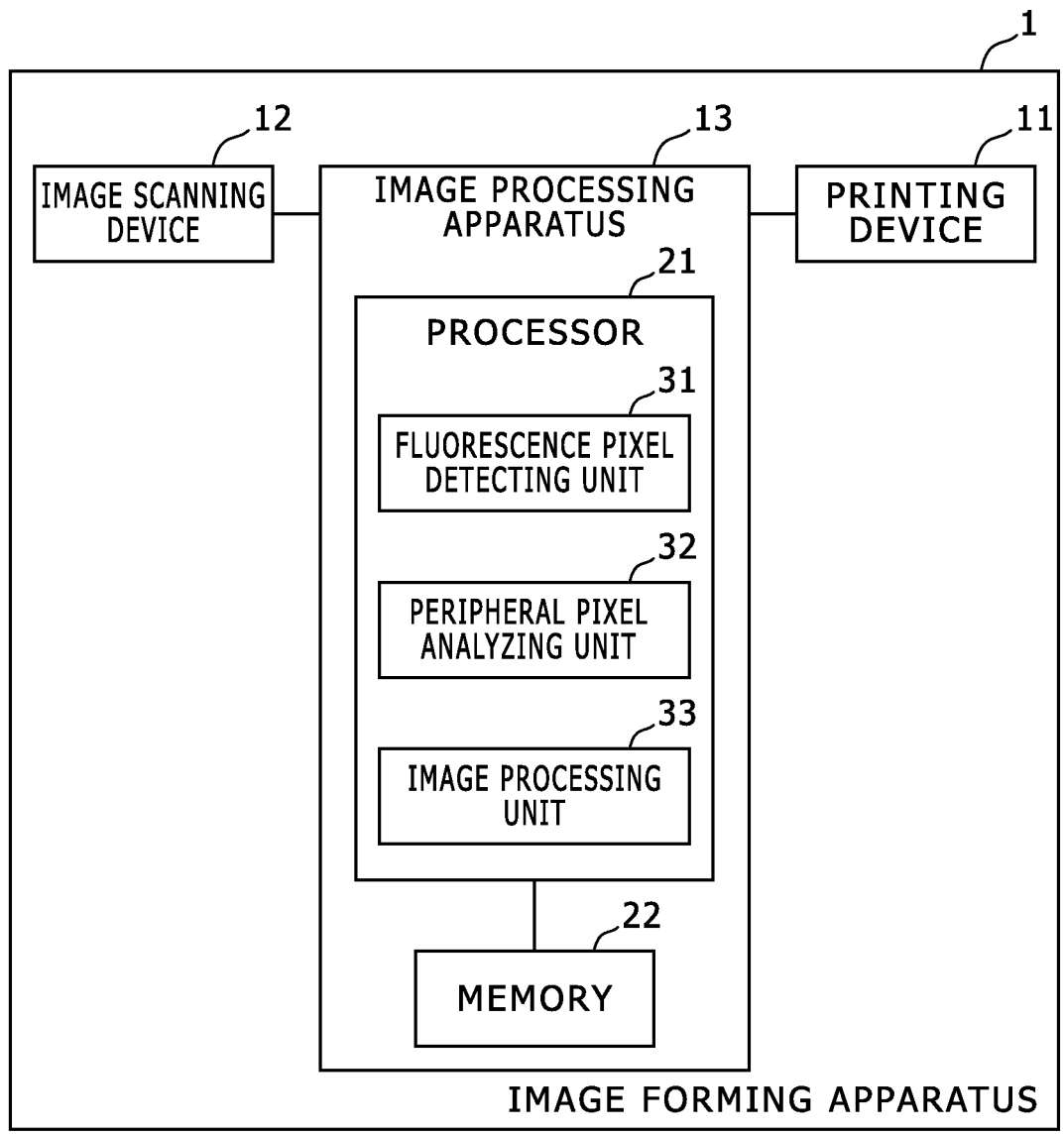
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure. Here, the image forming apparatus 1 shown in FIG. 1 is a copier. The image forming apparatus 1 may be a multi function peripheral or the like.

The image forming apparatus 1 includes a printing device 11, an image scanning device 12, and an image processing apparatus 13.

The printing device 11 is an internal device which prints a document image based on image data. For example, the printing device 11 prints a document image based on image data obtained by performing predetermined image processing in the image processing apparatus 13 for image data of a document image acquired by the image scanning device 12.

The image scanning device 12 is an internal device which optically scans a document image of a document and generates image data of the document image.

The image processing apparatus 13 performs predetermined image processing for image data such as the image data generated by the image scanning device 12.

The image processing apparatus 13 includes a processor and a memory 22. The processor 21 includes an ASIC (Application Specific Integrated Circuit) and/or a micro computer, and embodies processing units. The memory 22 is a rewritable memory device such as RAM (Random Access Memory). In the memory 22, temporarily stored are image data before image processing, image data in the middle of the image processing, image data after the image processing, and the like.

Further, the processor 21 embodies as processing units a fluorescence pixel detecting unit 31, a peripheral pixel analyzing unit 32, and an image processing unit 33.

The fluorescence pixel detecting unit 31 detects a fluorescence pixel that has a fluorescent color in the aforementioned document image. For example, the fluorescence pixel detecting unit 31 converts a color space of the document image from a RGB color space to a Lab color space, and detects as the fluorescence pixel a pixel that has a color within a predetermined range in the Lab color space. Further, the fluorescence pixel detecting unit 31 detects a background color of the document image (i.e. a color of a sheet material of the document).

The aforementioned predetermined area may consist of plural areas corresponding to plural different fluorescent colors of plural fluorescent ink pens, respectively. For example, as the aforementioned predetermined area, one or more areas corresponding to one or more fluorescent colors is/are set among six yellowish, greenish, cyanish, orangish, pinkish and purplish colors.

For example, for a yellowish fluorescent ink pen, the aforementioned predetermined range is set as a color range of $93<L<100$, $-10<a<10$, and $98<b<140$.

The peripheral pixel analyzing unit 32 detects, as a pixel of a character, consecutive non-fluorescence pixels with no fluorescent colors among peripheral pixels within a predetermined range (e.g. 10×10 pixels from the fluorescence pixel as a center) from the detected fluorescence pixel. The consecutive non-fluorescence pixels to be detected is at least a predetermined number (e.g. 5 pixels) of consecutive pixels and has a color difference equal to or less than a predetermined value between one and another thereof. However, among these consecutive non-fluorescence pixels, a pixel with the background color is excluded from the pixel of the character.

The aforementioned color difference, for example, is a distance in the Lab color space. If a distance in the Lab color space is used as the aforementioned color difference, the peripheral pixel analyzing unit 32 determines the aforementioned color difference using Lab data of the document image obtained by the aforementioned color conversion in the fluorescence pixel detecting unit 31. Alternatively, the aforementioned color difference may be a difference between pixel values of each component in (R, G, B). In such a case, if all values of the differences of R, G and B is equal to or less than a predetermined value, then it is determined that the color difference is equal to or less than the predetermined value.

In the document image, when a pixel has not been detected as a fluorescence pixel, this pixel is identified as a non-fluorescence pixel. The Lab values of a pixel in a high-density black character or a low-density gray character overlaid with a fluorescent color are outside of the aforementioned predetermined range in the Lab color space, and consequently, such pixel is not detected as a fluorescence pixel and is identified as a non-fluorescence pixel.

The image processing unit 33 performs an emphasizing process of improving visibility for the detected consecutive non-fluorescence pixels. The emphasizing process includes at least one of: (a) an achromatization process that converts a color of the consecutive non-fluorescence pixels to an achromatic color, (b) a filtering process for the non-fluorescence pixels using a differential filter, and (c) a complementary-coloring process that converts a color of the non-fluorescence pixels to a complementary color of a fluorescent color of the fluorescence pixel.

Figure 2:
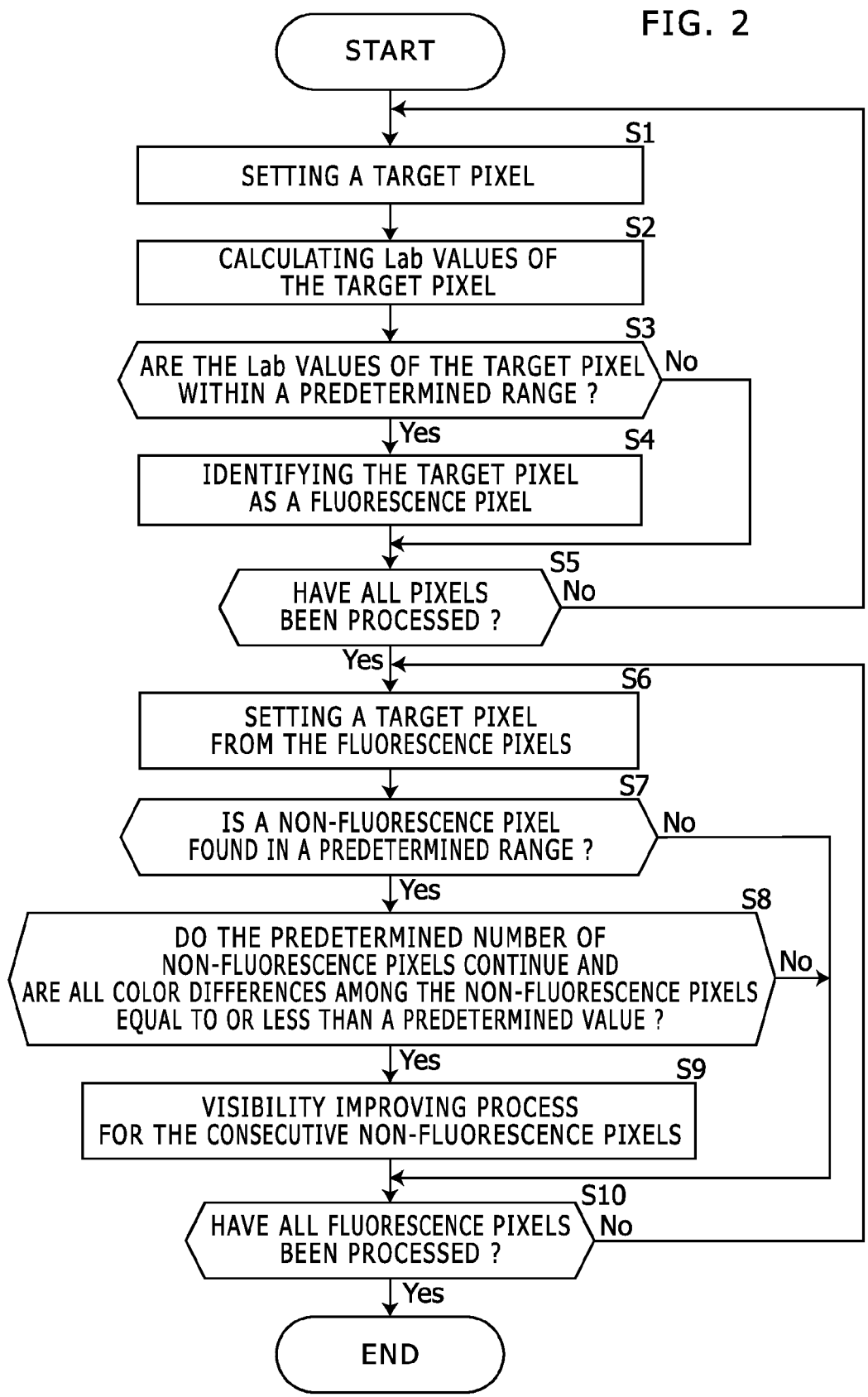
FIG. 2 shows a flowchart that explains a behavior of an image processing apparatus 13 shown in FIG. 1.

The following part explains a behavior of the aforementioned image processing apparatus. FIG. 2 shows a flowchart that explains a behavior of the image processing apparatus 13 shown in FIG. 1.

When storing image data of a document image generated by the image scanning device 12 into the memory 22, the processor 21 immediately performs the following process. This image data has RGB values for each pixel.

The fluorescence pixel detecting unit 31 sets a target pixel in a document image (in Step S1). When considering a primary scanning direction as X coordinate and a secondary scanning direction as Y coordinate and expressing coordinate values of a pixel as (X, Y), the fluorescence pixel detecting unit 31 sets a pixel of the coordinate values (0, 0) as a first target pixel, changes the target value in turn along the primary scanning direction, and after reaching the end of a line, sets a top pixel of the next line in the secondary scanning direction as the target pixel. Afterward, the fluorescence pixel detecting unit 31 changes the target pixel in this order.

The fluorescence pixel detecting unit 31 reads RGB values of the target pixel, and converts these RGB values to Lab values (in Step S2).

Subsequently, the fluorescence pixel detecting unit 31 determines whether the Lab values of the target pixel is in the aforementioned predetermined range or not (in Step S3).

If the Lab values of the target pixel is in the aforementioned predetermined range then the fluorescence pixel detecting unit 31 identifies the target pixel as a fluorescence pixel (in Step S4). If the Lab values of the target pixel is not in the aforementioned predetermined range then the fluorescence pixel detecting unit 31 does not identify the target pixel as a fluorescence pixel (namely, identifies the target pixel as a non-fluorescence pixel) (in Step S4).

Subsequently, the fluorescence pixel detecting unit 31 determines whether the identification of whether a fluorescence pixel or not has been done for all pixels in the document image or not (in Step S5). If this identification is not done for at least one pixel, then returning to Step S1, for the next target pixel, the aforementioned process is performed as well.

When the identification of whether a fluorescence pixel or not has been done for all pixels in the document image, the peripheral pixel analyzing unit 32 sets one of the fluorescence pixels detected in the aforementioned process as a target pixel (in Step S6).

Subsequently, the peripheral pixel analyzing unit 32 determines whether non-fluorescence pixels are in a predetermined range from the target pixel (in Step S7).

If it is determined that non-fluorescence pixels are in a predetermined range from the target pixel, then the peripheral pixel analyzing unit 32 determines whether (a) the non-fluorescence pixels are at least a predetermined number of consecutive pixels in the primary scanning direction, the secondary scanning direction or an oblique direction and (b) each color difference between one and another of the non-fluorescence pixels (i.e. the largest color difference between two pixels among the non-fluorescence pixels) is equal to or less than a predetermined value or not (in Step S8).

If (a) the non-fluorescence pixels are at least a predetermined number of consecutive pixels in line and (b) each color difference between one and another of the non-fluorescence pixels (i.e. the largest color difference between two pixels among the non-fluorescence pixels) is equal to or less than a predetermined value, then the image processing unit 33 identifies the consecutive non-fluorescence pixels as pixels of a character and therefore performs an emphasizing process for all of the consecutive non-fluorescence pixels (in Step S9).

It should be noted that if no non-fluorescence pixels are in the predetermined range from the target pixel in Step S7 or if the non-fluorescence pixels are not consecutive as at least the predetermined pixel number of pixels or at least one of the color differences of the plural non-fluorescence pixels exceeds the predetermined value, then the process in Step S9 is not performed.

Subsequently, the peripheral pixel analyzing unit 32 determines whether the aforementioned processes have been done for all of the non-fluorescence pixels or not (in Step S10). If the aforementioned processes have not been done for at least one of the non-fluorescence pixels, then returning to Step S6, for the next target pixel, the aforementioned processes are performed as well. However, for the non-fluorescence pixel for which the emphasizing process has already been performed, the emphasizing process is not performed.

In the aforementioned manner, the emphasizing process is performed for all pixels identified as pixels of a character near the fluorescence pixel in the document image. Therefore, when printing on the basis of image data for which such image processing has been performed, even if a character in a document is marked with a fluorescent ink pen, a copy obtained by the printing gets high visibility on such character therein.

In the aforementioned embodiment, the fluorescence pixel detecting unit 31 detects a fluorescence pixel that has a fluorescent color in a document image. The peripheral pixel analyzing unit 32 detects consecutive non-fluorescence pixels with no fluorescent colors among peripheral pixels within a predetermined range from the detected fluorescence pixel where the consecutive non-fluorescence pixels is at least a predetermined number of consecutive pixels and has a color difference equal to or less than a predetermined value between one and another thereof. The image processing unit 33 performs an emphasizing process of improving visibility for the detected consecutive non-fluorescence pixels.

Therefore, a character overlaid with a fluorescent color is properly detected and for such character the emphasizing process is performed, and consequently high visibility of a character is provided in a document image scanned from a document in which a character is overlaid with a fluorescent color.

The description has been presented for purposes of illustration and description, and is not intended to be exhaustive or limited.

For example, if non-fluorescence pixels continues from inside to outside of the predetermined range, then the image processing unit 33 may additionally perform the emphasizing process for the non-fluorescence pixels in the outside of the predetermined range continuing the aforementioned consecutive non-fluorescence pixels in the inside of the predetermined range. In such a case, if a part of a character is overlaid with a fluorescent color, then the emphasizing processing is performed for the whole part of the character rather than for the part of the character, and consequently the visibility after the emphasizing process gets higher.

Further, in the aforementioned embodiment, the image processing unit 33 may adjust intensity of the emphasizing process on the basis of a color difference between the consecutive non-fluorescence pixels and the fluorescence pixel (e.g. a color difference between an average color of the consecutive non-fluorescence pixels and a color of the fluorescence pixel or the like). For example, in a case of the achromatization process or the complementary-coloring process, the luminance value after the achromatization process or the complementary-coloring process may be adjusted on the basis of this color difference. Further, for example, in a case of the filtering process, at least a filter coefficient in the filtering process may be adjusted on the basis of this color difference.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
a fluorescence pixel detecting unit configured to detect a fluorescence pixel that has a fluorescent color in a document image;
a peripheral pixel analyzing unit configured to detect consecutive non-fluorescence pixels with no fluorescent colors among peripheral pixels within a predetermined range from the detected fluorescence pixel, the consecutive non-fluorescence pixels being at least a predetermined number of consecutive pixels and having a color difference equal to or less than a predetermined value between one and another of the consecutive non-fluorescence pixels and the consecutive non-fluorescence pixels are not the same as a background color;
an image processing unit configured to perform an emphasizing process of improving visibility for the detected consecutive non-fluorescence pixels.

2. The image processing apparatus according to claim 1, wherein if non-fluorescence pixels continues from inside to outside of the predetermined range, then the image processing unit additionally performs the emphasizing process for the non-fluorescence pixels in the outside of the predetermined range continuing the consecutive non-fluorescence pixels in the inside of the predetermined range.

3. The image processing apparatus according to claim 1, wherein the image processing unit adjusts intensity of the emphasizing process on the basis of a color difference between the consecutive non-fluorescence pixels and the fluorescence pixel.

4. The image processing apparatus according to claim 1, wherein the emphasizing process includes at least one of: (a) an achromatization process that converts a color of the non-fluorescence pixels to an achromatic color, (b) a filtering process for the non-fluorescence pixels using a differential filter, and (c) a complementary-coloring process that converts a color of the non-fluorescence pixels to a complementary color of a fluorescent color of the fluorescence pixel.

* * * * *